A. K. SCHAAP.
EXPLOSIVE ENGINE OF THE INTERNAL COMBUSTION TYPE.
APPLICATION FILED DEC. 18, 1920. RENEWED JAN. 18, 1922.

1,408,475.

Patented Mar. 7, 1922.

INVENTOR
ALEXANDER K. SCHAAP
BY
Q. Abby Edwards
ATTORNEY

UNITED STATES PATENT OFFICE.

ALEXANDER K. SCHAAP, OF NEW YORK, N. Y.

EXPLOSIVE ENGINE OF THE INTERNAL-COMBUSTION TYPE.

1,408,475.     Specification of Letters Patent.     Patented Mar. 7, 1922.

Application filed December 18, 1920, Serial No. 431,546. Renewed January 18, 1922. Serial No. 530,233.

*To all whom it may concern:*

Be it known that I, ALEXANDER K. SCHAAP, a citizen of the United States, and a resident of the city of New York, county of Kings, and State of New York, have invented a new and useful Improvement in Explosive Engines of the Internal-Combustion Type, of which the following is a specification.

The object of my invention is to provide an improvement in engines of this type which will enable such engines to run more quietly and without disruptive shocks which are ordinarily transmitted to crank shafts and cause an undesirable crystallization in the shaft, the piston and piston rod of the engine. A further object is to save the bearings from the disruptive action of blows.

These and other objects are accomplished by my invention, one embodiment of which is hereinafter more particularly set forth.

For a more exact description of my invention, reference is to be had to the accompanying drawings, forming a part hereof, in which—

Throughout the various views of the drawings, similar reference characters designate similar parts.

Figure 1:
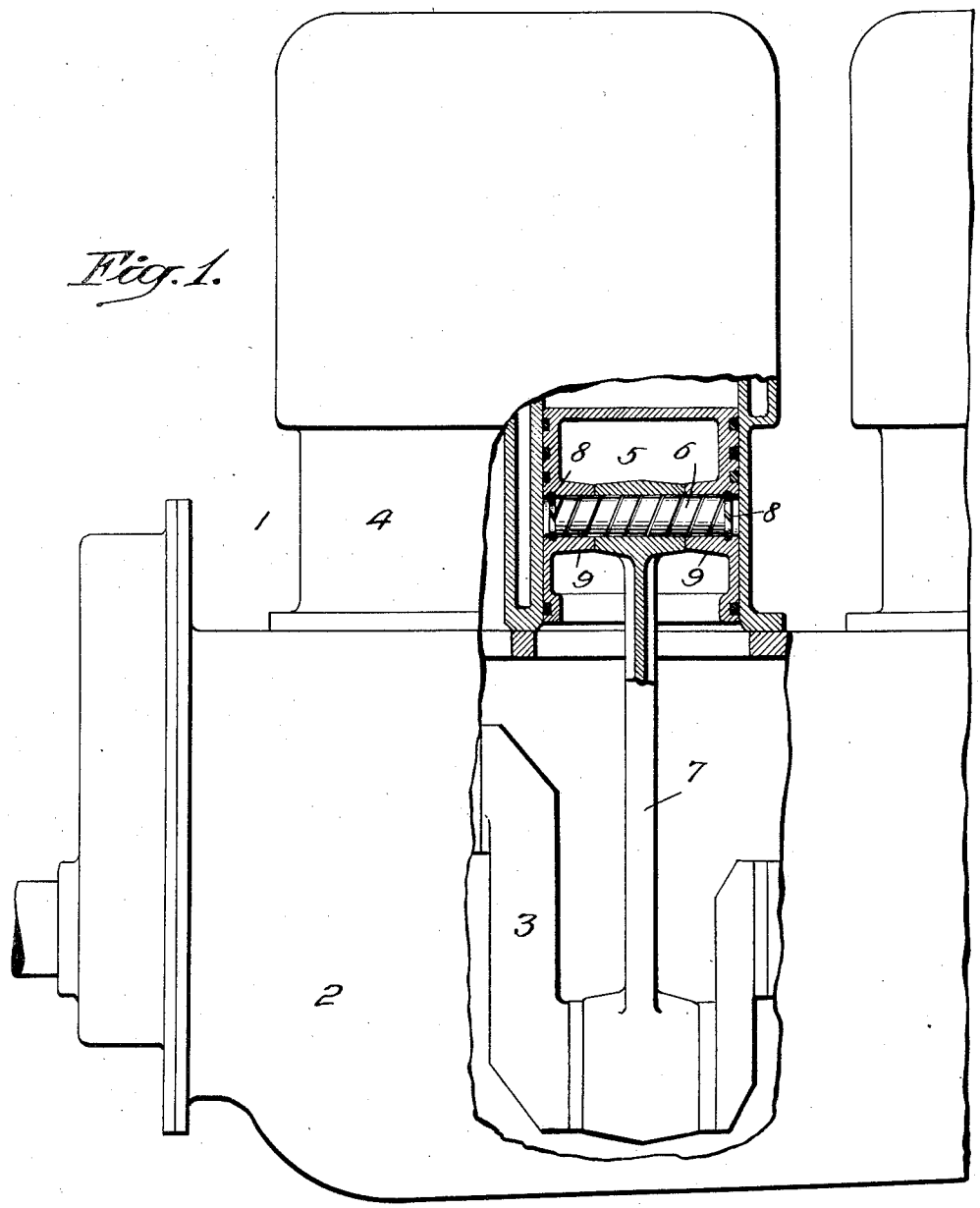
Figure 1 is a side elevation, partially in section, of an engine provided with my improvement.
Figure 2:
Figure 2 is a side elevation of a wrist pin employed in such engine.
Figure 3:
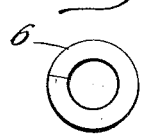
Figure 3 is an end elevation of this wrist pin.

My improved engine 1 is provided with the usual crank case 2 in which is mounted the conventional crank shaft 3 and on which is mounted the cylinders 4 each of which has a piston 5 of the usual type, a wrist pin 6 which connects its piston 5 to a piston rod 7 of the usual type. Each piston rod 7 is connected to the crank 3 in the conventional manner.

The wrist pin 6 is not a rigid wrist pin but is slightly elastic and is preferably made in the form of a roller found in the "Hyatt" roller bearings, that is, each wrist pin 6 is composed of a rod of spring steel bent under compression into a spiral form, as indicated. Each wrist pin may be held in its piston 5 by means of a small retaining ring 8 which fits in a corresponding recess in the piston or in any other suitable manner. In the preferred embodiment of my invention, the piston rod 7 has its upper end fitting between two inwardly projecting bosses 9 of the piston 5 with the usual working fit.

When a wrist pin of the kind described is employed, as above set forth, and the engine is in normal operation, the explosion of the mixed gases above the piston causes motion to be transmitted from the piston 5 to the piston rod 7 through a slightly elastic wrist pin with a very slight lost motion which cushions the action of the piston on the piston rod and the crank which is connected to the piston rod as well as the bearings of the crank 3 in the crank case 2. On the expelling stroke this cushioning action is not so pronounced and is reversed as power is then transmitted from the shaft through the piston rod to the piston and on the suction stroke there is still a slight cushioning effect at each end of the stroke. In the compression stroke the cushioning effect is more pronounced and as in the explosive stroke, this cushioning effect is sufficient to prevent disruptive shocks from being transmitted from the piston to the piston rod and through the piston rod to the connected parts above specified.

The wrist pin 6 may be mounted in the piston rod 7 and piston 8 in any conventional way as it may be made full floating or held in the center, or at either end, as desired.

While I have shown and described one embodiment of my invention, it is obvious that it is not restricted thereto, but is broad enough to cover all structures that come within the scope of the annexed claims.

Having thus described my invention, what I claim is:

1. In an engine of the class described, a piston, a piston rod and an elastic wrist pin connecting the two.

2. In an engine of the class described, a piston, a piston rod and a wrist pin connecting the two, said wrist pin being composed of a rod wound into a spiral form.

3. In an engine of the class described, a piston, a piston rod and a wrist pin connecting the two, the wrist pin being formed in the shape of a roller of a "Hyatt" roller bearing.

In testimony whereof I have hereunto set my hand and seal November, 1920.

ALEXANDER K. SCHAAP.